Patented Aug. 17, 1943

2,327,009

UNITED STATES PATENT OFFICE 2,327,009

METHOD OF PRODUCING ROSIN ESTERS

Wyly M. Billing, Wilmington, Del., assignor to Hercules Powder Company, Wilmington, Del., a corporation of Delaware No Drawing. Application June 29, 1940, Serial No. 343,153

7 Claims. (Cl. 260—104)

This invention relates to an improved method of producing rosin esters and more particularly relates to an improved method for producing a diethylene glycol ester of a rosin.

In U. S. Patent 1,779,710 to George M. Norman a method of producing the diethylene glycol ester of abietic acid is described involving heating of diethylene glycol with rosin at a temperature of 250° to 260° C. in the presence of a catalyst such as zinc dust, boric acid, etc. The patent states that superatmospheric pressure is necessary if temperatures above 260° C. are to be employed.

I have found that in order to produce an ester of low acidity by the above method it is necessary to heat the ingredients at the above temperature for an abnormally long time even with use of the catalyst. Prolonged heating of rosin at elevated temperatures is injurious to rosin since it tends to discolor it appreciably and also to decarboxylate it. Furthermore, use of a catalyst in the esterification is not very practical since it is necessary to remove the catalyst from the finished ester, an operation which in some cases is attended with difficulties, and also since the catalysts generally have some deleterious effect on the rosin or rosin ester, such as affecting its water sensitivity, its melting point, etc. Furthermore, use of superatmospheric pressure is undesirable both from the standpoint of the expensive pressure equipment required and because the esterification does not become accelerated as might be expected.

I have found, in accordance with this invention, that I may avoid the above disadvantages of the prior methods and provide a superior method of esterification. Contrary to expectations, I have found that I may carry out the esterification of rosin with diethylene glycol at temperatures appreciably above the boiling point of diethylene glycol without use of superatmospheric pressure. I thereby have discovered a process of esterifying rosin with diethylene glycol which provides an ester of low acid number without use of catalyst, without use of superatmospheric pressure and in a shorter time than heretofore possible.

In accordance with this invention, I have discovered that if rosin is heated with approximately its equivalent combining proportion of diethylene glycol, or small excess thereover, at a temperature slightly below the boiling point of diethylene glycol, for example 230° to 250° C., for a period of time sufficient to combine most of the glycol, for example about 2 to 4 hours, that the temperature may thereafter be raised rapidly to a point appreciably above the boiling point of the diethylene glycol, for example 270° to 300° C., to complete the esterification without loss of diethylene glycol by volatilization.

As a result of my improved process I am able to prepare a diethylene glycol ester of rosin without using a catalyst or superatmospheric pressure so as to obtain an ester of low acidity without contamination by catalyst materials or the defects in the ester which use of catalyst introduces. I am also able to produce an ester with low acidity in a shorter heating period than has heretofore been possible.

I have found that my improved process is applicable to such rosins as wood rosin or gum rosin, abietic acid, hydrogenated rosin, polymerized rosin, rearranged rosin such as Hyex rosin, etc. I classify these materials as rosins for the purposes of describing my invention.

My improved process is particularly well adapted to producing the diethylene glycol esters of rosins having low acid numbers. Esters having acid numbers below about 10 are readily capable of production by my method without use of an appreciable excess of glycol.

My invention may be illustrated more fully by the following specific examples:

Example I

Two hundred and sixty-six parts by weight of N wood rosin and 49 parts by weight of diethylene glycol were heated together to a temperature of 230° C. in about 2 hours and the temperature then maintained at about 240° C. for about 3 hours. After this time the diethylene glycol was practically completely in combined form. The temperature was then raised as rapidly as possible to about 285° C. and held at the latter temperature under atmospheric pressure for approximately 6 hours. Reduced pressure was then applied for ½ hour to remove any slight amount of uncombined diethylene glycol or other volatile matter. The resulting ester had an acid number of 8, a drop melting-point of 46° C. and a Lovibond color of 22 Amber.

Example II

Six hundred and eighty-eight parts by weight of distilled hydrogenated rosin having a saturation corresponding to about 70 per cent of both double bonds of the rosin and 106 parts by weight of diethylene glycol were heated together to a temperature of 230° C. in about 2 hours and then maintained at about 240° C. for about 3 hours. At the end of this reaction period, the temperature was raised rapidly to about 285° C. and held at the latter temperature for approximately 12½ hours. Reduced pressure of 15 mm. mercury was then applied for ½ hour to remove any slight excess of diethylene glycol or other volatile material while maintaining the temperature at 285° C. The diethylene glycol ester of hydrogenated rosin obtained had an acid number of 16.5, a drop melting-point of 40° C. and a Lovibond color of 30 Amber.

It will be apparent from the above description and examples that my improved process provides a more satisfactory method for obtaining diethylene glycol esters of rosins of low acidity. Thus, it provides a means of preparing such an ester without use of superatmospheric pressure and without use of catalysts. Moreover it makes it possible to obtain a low acidity ester in a shorter reaction time than has been heretofore possible.

It will be understood that the details and examples hereinbefore set forth are illustrative only, and that the invention as broadly described and claimed is in no way limited thereby.

What I claim and desire to protect by Letters Patent is:

1. The method of producing the diethylene glycol ester of a rosin which comprises heating a mixture consisting of a rosin and an amount of diethylene glycol which is at least about the equivalent combining proportion and no more than a slight excess thereover at a temperature slightly below the boiling point of the glycol for a period of time sufficient to combine essentially all of the glycol in the form of an ester containing a substantial amount of free rosin, then raising the temperature rapidly to within the range of about 270° C. to about 300° C. under atmospheric pressure and continuing the heating at the latter temperature until an ester of low acidity is produced.

2. The method of producing the diethylene glycol ester of a rosin which comprises heating a mixture consisting of a rosin and an amount of diethylene glycol which is at least about the equivalent combining proportion and no more than a slight excess thereover at a temperature of about 230° C. to about 250° C. for a period of time sufficient to combine essentially all of the glycol in the form of an ester containing a substantial amount of free rosin, then raising the temperature rapidly to within the range of about 270° C. to about 300° C. under atmospheric pressure and continuing the heating at the latter temperature until an ester of low acidity is produced.

3. The method of producing the diethylene glycol ester of a rosin which comprises heating a mixture consisting of a rosin and approximately the equivalent combining proportion of diethylene glycol at a temperature slightly below the boiling point of the glycol for a period of time sufficient to combine essentially all of the glycol in the form of an ester containing a substantial amount of free rosin, then raising the temperature rapidly to within the range of about 270° C. to about 300° C. under atmospheric pressure and continuing the heating at the latter temperature until an ester of low acidity is produced.

4. The method of producing the diethylene glycol ester of wood rosin which comprises heating a mixture consisting of wood rosin and an amount of diethylene glycol which is at least about the equivalent combining proportion and no more than a slight excess thereover at a temperature slightly below the boiling point of the glycol for a period of time sufficient to combine essentially all of the glycol in the form of an ester containing a substantial amount of free rosin, then raising the temperature rapidly to within the range of about 270° C. to about 300° C. under atmospheric pressure and continuing the heating at the latter temperature until an ester of low acidity is produced.

5. The method of producing the diethylene glycol ester of hydrogenated rosin which comprises heating a mixture consisting of hydrogenated rosin and an amount of diethylene glycol which is at least about the equivalent combining proportion and no more than a slight excess thereover at a temperature slightly below the boiling point of the glycol for a period of time sufficient to combine essentially all of the glycol in the form of an ester containing a substantial amount of free rosin, then raising the temperature rapidly to within the range of about 270° C. to about 300° C. under atmospheric pressure and continuing the heating at the latter temperature until an ester of low acidity is produced.

6. The method of producing the diethylene glycol ester of gum rosin which comprises heating a mixture consisting of gum rosin and an amount of diethylene glycol which is at least about the equivalent combining proportion and no more than a slight excess thereover at a temperature slightly below the boiling point of the glycol for a period of time sufficient to combine essentially all of the glycol in the form of an ester containing a substantial amount of free rosin, then raising the temperature rapidly to within the range of about 270° C. to about 300° C. under atmospheric pressure and continuing the heating at the latter temperature until an ester of low acidity is produced.

7. The method of producing the diethylene glycol ester of a rosin which comprises heating a mixture consisting of a rosin and an amount of diethylene glycol which is at least about the equivalent combining proportion and no more than a slight excess thereover at a temperature slightly below the boiling point of the glycol for a period of time sufficient to combine essentially all of the glycol in the form of an ester containing a substantial amount of free rosin, then raising the temperature rapidly to within the range of about 270° C. to about 300° C. under atmospheric pressure and continuing the heating at the latter temperature until an ester of low acidity is produced, then reducing the pressure and distilling off any volatile material.

WYLY M. BILLING.